April 14, 1970 R. D. RUMSEY 3,506,081
WHEEL DRIVING HYDRAULIC MOTOR CIRCUITS
Filed Dec. 29, 1967 2 Sheets-Sheet 1
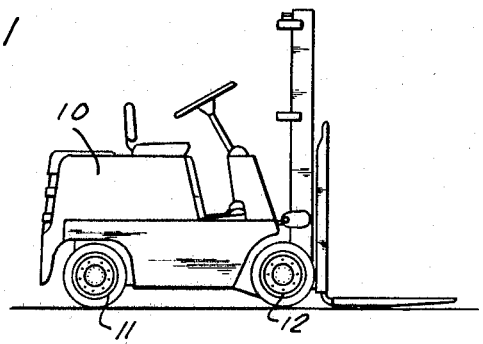
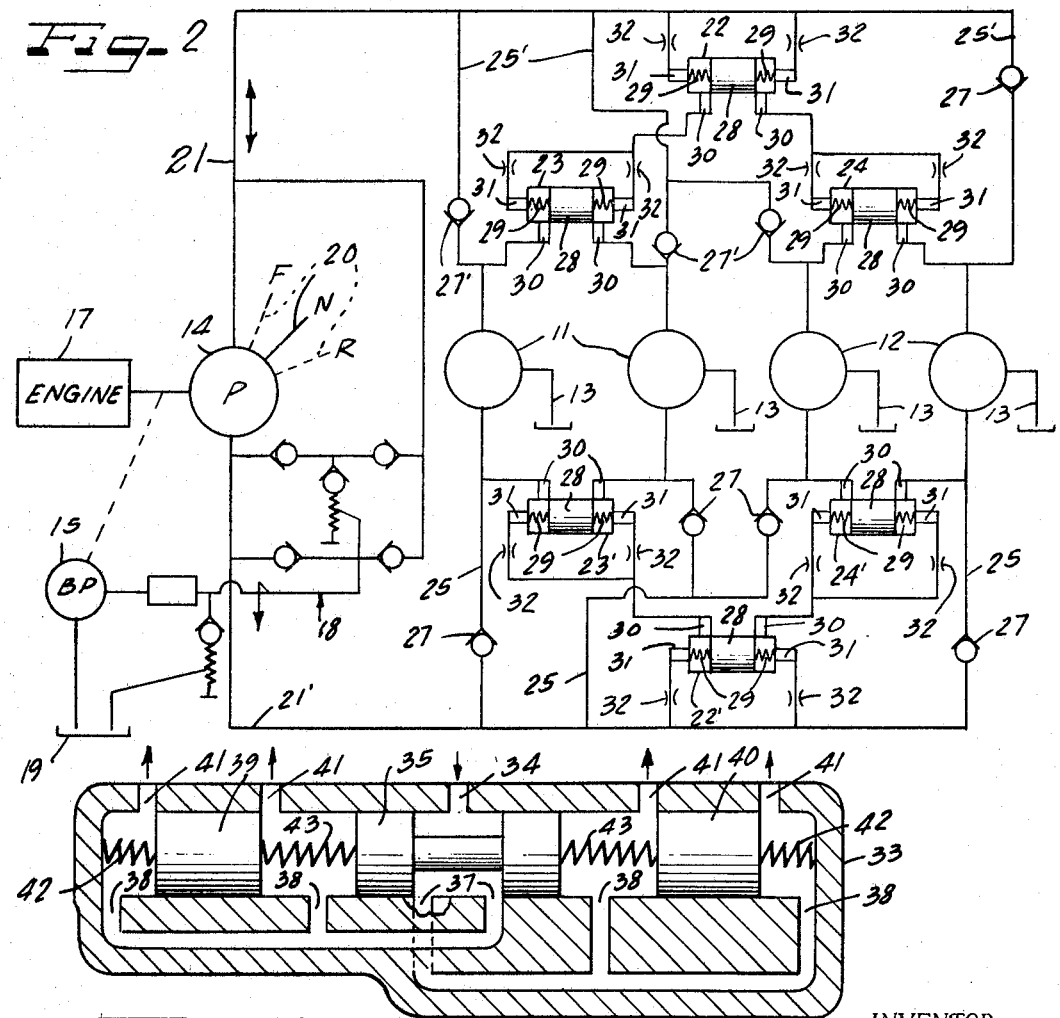
INVENTOR.
ROLLIN DOUGLAS RUMSEY
BY ATTORNEYS

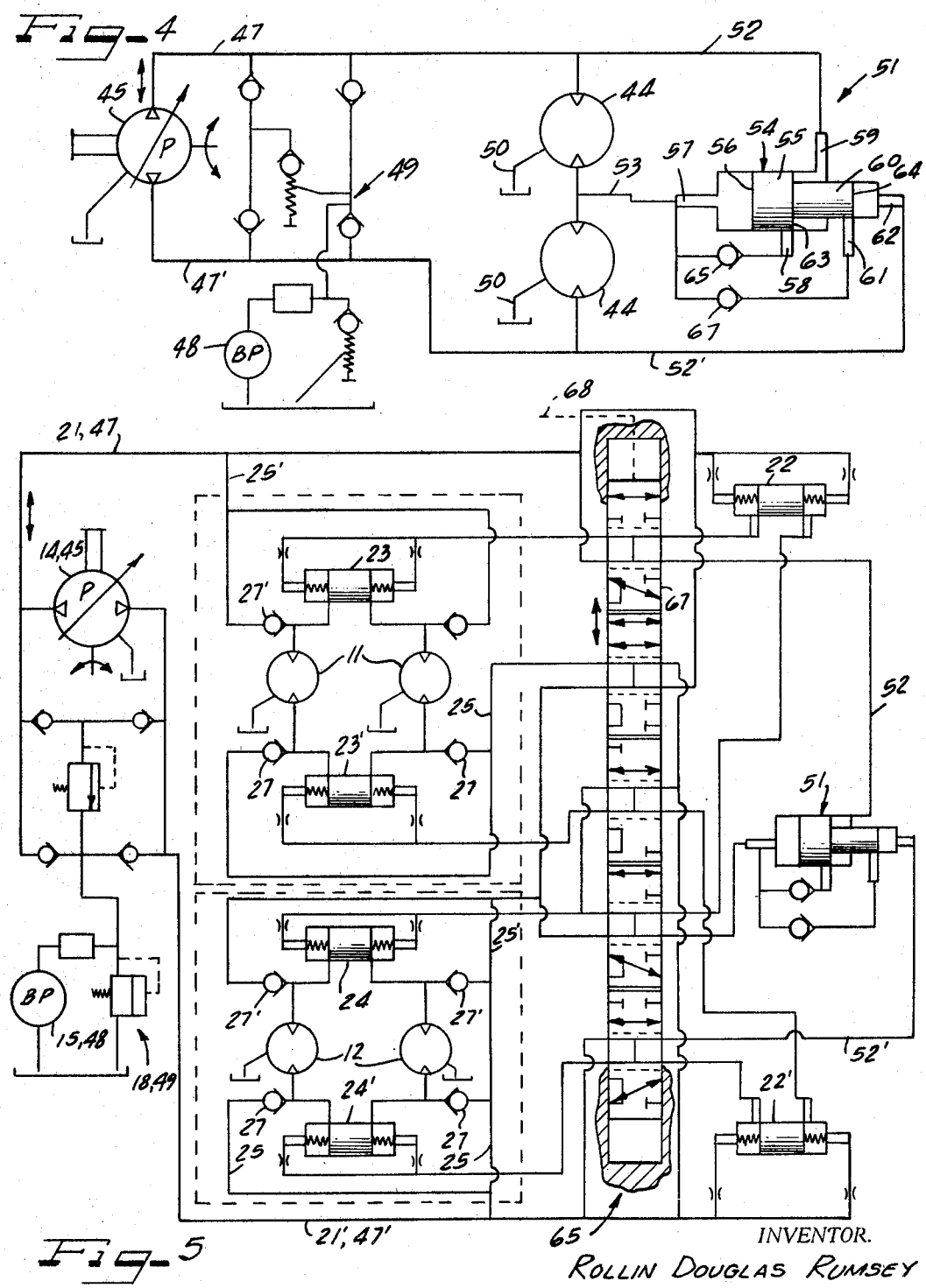

United States Patent Office 3,506,081
Patented Apr. 14, 1970

3,506,081
WHEEL DRIVING HYDRAULIC MOTOR CIRCUITS
Rollin Douglas Rumsey, Buffalo, N.Y., assignor to
Houdaille Industries Inc., Buffalo, N.Y., a corporation of Michigan
Filed Dec. 29, 1967, Ser. No. 694,549
Int. Cl. B60k *17/34;* F15b *13/06*
U.S. Cl. 180—44                                     8 Claims

ABSTRACT OF THE DISCLOSURE

Hydraulic circuits for hydraulic driving motors for members such as wheels operating in parallel or in series have control valves automatically operative in response to differential pressure reference from any motor to equalize the speed and driving torque of the motors to maintain substantially equal speed in the member, resulting in equal force of traction in driven wheels. In a parallel motor circuit series related flow splitter valves are used. In a series motor arrangement a pressure compensation valve is employed. In a system in which the motors are selectively in parallel or in series, a combination of the valving is provided for alternative use.

---

This invention relates to wheel driving hydraulic motor circuits and is more particularly concerned with improving the operation of individually hydraulically motivated vehicle wheels.

In the use of hydraulic wheel driving motors operating in parallel, if any one of the associated wheels encounters no traction resistance, such as being off of the traction surface, on a slippery spot such as on ice or oil, it will spin freely and rob all or at least a substantial part of the pressure oil from the other motors, possibly reducing the pump pressure to zero and the force of traction to zero, or at least slowing down or substantially detracting from the force of traction of the other wheels.

Where the hydraulic motors operate in series, a problem often encountered is that the motor operating at higher pressure will have higher internal and case leakage. Hence, the lower pressure motor will have less oil reaching it and it will turn slower. As a result, the high pressure motor will provide all the motive force with consequent uneven wear on the motors, tires, and the like.

It is, accordingly, an important object of the present invention to provide novel control means in the hydraulic operating circuits for hydraulic driving motors to adjust the driving speed of the motors to effect substantially uniform driving force or torque in the driven members, such as maintaining uniform force of traction in driven wheels.

Another object of the invention is to provide new and improved control means for maintaining in a simple and efficient manner as nearly as practicable equal speeds and equal torque in driving hydraulic motors of the character indicated.

A further object of the invention is to provide in the operation of wheel driving hydraulic motors control means causing the motors to be driven on the principle of a locking differential but with the safety advantages of minimal slip.

Still another object of the invention is to provide a new and improved hydraulic operating and control system for individual hydraulic driving motors in parallel, affording continuous equal hydraulic pressure to all motors when any one of the motors tends to run free.

Yet another object of the invention is to provide new and improved means for operating hydraulic driving motors in series at equal speeds driving force.

A still further object of the invention is to provide a new and improved system whereby hydraulic driving motors may be operated in parallel, as well as in series, without skidding, at equal speeds and equal driving.

Other objects, features and advantages of the present invention will be readily apparent from the following detailed description of certain preferred embodiments thereof taken in conjunction with the accompanying drawings, in which:

FIGURE 1 is a side elevational view of a vehicle such as a fork lift truck, representative of apparatus having members, herein wheels, adapted to be driven by individual hydraulic motors controlled according to the present invention.

FIGURE 2 is a schematic illustration of a hydraulic operating system for a four wheel hydraulic motor drive embodying features of the invention.

FIGURE 3 is a longitudinal schematic sectional view through a combination control valve arrangemnt adapted for use in the circuit of FIGURE 2.

FIGURE 4 is a schematic hydraulic system diagram showing application of the invention to a series arrangement of driving hydraulic motors, and FIGURE 5 is a schematic illustration of a hydraulic system for operating and controlling wheel driving motors selectively in parallel or in series and embodying features of the present invention.

By way of example of a type of vehicle in which the use of hydraulic wheel driving motors is especially satisfactory, there is shown in FIGURE 1 a forklift truck having rear wheels 11 and front wheels 12 all four of which may be hydraulically driven by means of respective motors, or any two of which may be so driven.

In FIGURE 2 a four wheel drive system is depicted in which all of the wheels are driven by respective hydraulic motors which, for convenience are identified by the same reference numerals as the respective wheels, namely, 11 for the rear wheel hydraulic motors and 12 for the front wheel hydraulic motors inasmuch as the wheels are actually merely traction extensions of the motors. Each of the motors may be provided with a case drain duct 13.

In the hydraulic operating means for the wheels, of which the motors 11 and 12 are a part, hydraulic pressure is produced by a pump 14 which may be of the variable displacement cross center type and supercharged by a booster pump 15, with both of the pumps driven by suitable engine 17. More or less conventional replenishing and pressure relief circuit means 18, including suitable check valves, pressure relief valves and filter and heat exchanger means, connect the booster pump 15 in an operative relation with the main pump 14. Suitable suction and return ducts communicate with a sump 19.

Control means 20 are provided for the pump 14, operative between a neutral, non-running condition of the vehicle, a forward running condition of the vehicle and a reverse running condition of the vehicle, as schematically depicted. Hydraulic fluid for actuating the motors 11 and 12 in one of the running directions is supplied from the pump 14 through a hydraulic circuit 21, while hydraulic fluid from the pump to actuate the motors for running in the opposite direction is supplied through the hydraulic circuit 21'. Since, in this instance, the motors 11 and 12 are operated in parallel, the circuits 21 and 21' are identical, and while one of the circuits is supplying hydraulic fluid under pressure, the other of the circuits serves to return spent hydraulic fluid from the motors.

According to the present invention, the circuits 21 and 21' have control means operative to adjust the driving torque of the motors to effect substantially uniform force of traction in the wheels. For this purpose, each of the circuits 21 and 21' has a set of flow control valves or flow splitter valves comprising a first valve 22 and 22', respectively through which all of the pressure fluid for actuating the motors must pass from the pump. From the valve 22 normally pressure fluid is distributed in equal volume to a control valve 23 which normally distributes equal volumes of pressure fluid to the motors 11, and to a control valve 24 which distributes equal volumes of the pressure fluid to the motors 12. While the motors 11 and 12 are being supplied with hydraulic pressure fluid through the respective valves 23 and 24, spent hydraulic fluid from the motors is returned to the pump 14 through return ducts 25 having respective check valves 27 and communicating with the main duct of the circuit 21' connected with the pump. Conversely, hydraulic pressure fluid in the circuit 21' is normally split into equal volumes by the valve 21' to flow splitting valves 23' and 24' which normally split the flow to be equal to the motors 11 and 12 respectively. When actuated by pressure fluid through the valve 22', spent hydraulic fluid from the motors 11 and 12 returns to the pump through return ducts 25' having check valves 27' and connected with the main conduit of the circuit 21.

Desirably, each of the valves 22, 23 and 24, and its counterpart 22', 23' and 24', respectively, is of the biased shear cylindrical metering plunger type having a metering plunger 28 which is normally maintained by biasing means such as springs 29 acting on its opposite ends in centered relation between delivery orifices 30 which communicate with the downstream control valves or the motors, as the case may be. Split flow delivery of hydraulic pressure fluid to each of the valves is through respective opposite end ports 31 from respective slight pressure drop restrictions 32.

Assuming that all conditions are normal in either forward or reverse travel on the wheels, each of the control valves 22–24 and 22'–24' maintains its neutral relation in the system. However, should any one or more of the wheels encounter an abnormal condition tending either to increase or decrease its force of traction, there is an immediate and automatic response in the associated control valves to adjust the driving torque of the motors for substantially uniform force of traction in the wheels. For example, should one of the motors 11 encounter a condition of resistance the resulting back pressure will be immediately sensed by reference to the valve 23, or 23', as the case may be. This causes the plunger 28 of that valve to restrict proportionately flow out of the orifice 30 to the other of the motors paired with it. The resulting back pressure is also immediately sensed by the control valve 22 or 22', as the case may be, and its plunger 28 acts to restrict proportionately flow through the associated orifice 30 to the motors 12, thereby avoiding bleeding of flow from the loaded motor and thus increasing its power and the force of traction of the associated wheel. The same reaction will occur in respect to any of the motors 12, through their immediate control valve 24 or 24', as the case may be, and the upstream valve 22 or 22'.

On the other hand, should one of the wheels at any time while running encounter a lack of traction, as by being lifted from a traction surface, moving into position over a drop-off or a cavity, or riding onto a slick spot, such that there is a tendency for runaway operation of the affected motor and robbing of pressure fluid from the other motors, the higher pressure drop will be immediately sensed by the immediately upstream control valve 23, 24, or 23', 24', as the case may be, and the delivery orifice 30 to the affected motor will be restricted, the pressure drop across all of the orifices equalized, with uniform pressure fluid flow to all of the motors for continued uniform force of traction operation thereof. Thus the wheels which remain in traction engagement will continue to move the associated vehicle substantially uninterruptedly, and without hesitation in travel of the vehicle. When the substantially tractionless wheel then moves into full traction relation substantially equal with the other wheels, smooth and uninterrupted travel of the vehicle continues, in contrast to the holdback, slowdown, sometimes halting, of the vehicle and then jerky resumption of travel experienced where the system does not have a control means as exemplified by the flow splitter valves of the present invention.

In a simplified flow splitter control valve arrangement, as shown in FIGURE 3, all three control valves may be combined to operate in a single housing 33 which has a main line port 34 through which hydraulic pressure fluid is received from the pump to flow between the heads of a dumbbell valve plunger 35 and then through spaced delivery orifices 37 communicating with respective delivery ports 38, communicating with the respective opposite ends of downstream control valve plungers 39 and 40 which are centered between respective pairs of delivery orifices 41. Desirably, all of the valves 35, 39 and 40 are disposed in a common bore and are normally maintained by suitable biasing means in a neutral position relative to the respective delivery orifices. Desirably such biasing means comprise respective springs 42 between the housing and the adjacent ends of the plungers 39 and 40, and respective biasing springs 43 between the ends of the valve plunger 35 and the adjacent ends of the valve plungers 39 and 40. The pair of orifices 41 controlled by the valve plunger 39 is connected with one of the pair of hydraulic motors and the orifices 41 controlled by the valve plunger 40 are operatively connected with the remaining pair of motors. Any substantial variation in pressure responsiveness of any of the motors is referenced to the valve plunger 39 or 40, as the case may be, immediately upstream therefrom and thence to the valve plunger 35 to effect appropriate pressure drop equalization throughout the system. Thus, should the pressure resistance in any one of the hydraulic motors increase, backup of the pressure through the associated delivery port 41 is immediately reflected in response of the associated valve plunger 39 or 40 and the central valve plunger 35 separating proportional to the back pressure and effecting a corresponding restriction of the paired orifice 41 and the orifice 37 delivering to the other pair of motors. Conversely, should there be a greater pressure drop in respect to any of the motors, upstream valve plunger 39 or 40, as the case may be, will be shifted into flow restricting relation to the associated delivery orifice 41 and the central valve plunger 35 will shift to adjust flow to the remaining motors, thereby maintaining a substantially uniform pressure drop and flow to all of the motors.

In FIGURE 4 is depicted a system for opening hydraulic wheel motors 44 in series. For this purpose a suitably driven pump 45, desirably of the reversible type is connected by circuits 47 and 47' to drive the motors 44 in either of two rotary directions. When one of the circuits 47, 47' is the pressure circuit, the other of the circuits serve as the spent hydraulic fluid return circuit. A supercharging booster pump 48 is connected operatively with the circuits 47 and 47' by means of a replenishing and pressure relief circuit arrangement 49, having a desirable arrangement of check valves pressure relief valves, and oil filtration and heat exchange means. As illustrated, the hydraulic motors 44 are connected to each other and to the circuits 47 and 47' in such manner that hydraulic pressure fluid delivered by either circuit travels in series through the motors to drive the same. Each of the motors has a case drain 50.

Means are provided to assure motivation of both of the motors 44 at the same speed, and with equal driving torque to effect substantially uniform force of traction in the associated wheels in spite of any differentials in resistance that may tend to develop in either of the motors from any or a combination of factors such as uneven case drainage, uneven traction resistance, and the like. In a desirable arrangement, such means comprise an automatic adjusting circuit 51 connected by respective conduits 52 and 52' to the pump circuits 47 and 47' and connected equally to and between and referenced to the motors 44 by duct 53. In the control circuit 51 is a pressure sensitive valve 54 including a plunger valve 55 having an end 56 referenced directly to the pressure between the motors 44 by port 57 connected to the duct 53. Normally, the pressure across or between the motors 44 will be substantially the same as line operating pressure developed by the pump 45 with such minimal pressure drop that may be effected by line friction and any desirable restriction in or associated with the motors and normal pressure between the motors referenced to the valve plunger 55 maintains the plunger in closing relation to a delivery orifice 58 to thus shut such orifice off from a port 59 with which the connecting duct 52 communicates. At the same time a reduced diameter extension 60 of the plunger 55 shuts an orifice 61 and closes it from communication with a port 62 connected with the duct 52'. At any time the pressure between the two motors drops to a level lower than the median between the high pressure line and the return line, additional fluid will be supplied through the circuit 51 as by shifting of the valve plunger 55 to open the orifices 58 and 61 so that hydraulic pressure fluid can pass from the associated delivery port 59 or 62, respectively, depending on which of the circuits 47 and 47' is under pressure at the time. As the pressure drops on the end 56 of the compensating valve plunger 55, line pressure against a pressure surface 63 or against a pressure surface 64 on the plunger will drive the plunger in the direction of opening of the orifices 58 and 61. If the line pressure is coming from the duct 52, upon opening of the orifice 58 the pressure fluid will pass through a check valve 65 to the duct 53 and thus to the motors to supplement hydraulic fluid directly supplied to the motors in series from the main conduit of the circuit 47. If the pressure comes through the duct 52', it is delivered through the orifice 61 through a check valve 67 to the duct 53 and thence to the motors. In maintaining the proper compensating pressure relationship, each of the pressure surfaces 63 and 64 is about one-half the area of the end pressure surface 56 of the plunger valve 55.

In FIGURE 5 is shown a system in which there is a combination of the system of FIGURES 2 and 4 in that the hydraulic motors may be operated either all in parallel or in series. More particularly, in the four motor arrangement depicted all of the motors may be run in parallel for low speed, high torque operation, and may be run in two parallel series for high speed operation. To simplify the description, the same reference characters will be assigned in FIGURE 5 to all those elements which are common to FIGURES 2 and 4 and it will be understood that the same description applies. What is different in the system of FIGURE 5 is a three position valve 65 comprising a plunger 67 adapted to be operated hydraulically or mechanically through means identified schematically as 68. As shown, the valve 65 is an open circuit or neutral position. By shifting the valve plunger 67 downwardly from the position shown, disconnection of the series compensation valve 51 is effected and in operating connection for parallel motivation of the motors 11 and 12 under the control of the valves 22, 23, 24 or the valves 22', 23', 24', as the case may be, the same as described for the system of FIGURE 2. By shifting the valve plunger 67 upwardly from the position shown, the parallel control valves are disconnected and the series compensation valve 51 is connected with the motors so that each pair of motors 11 and 12 operates in series, the same as described for the system of FIGURE 4.

Although in FIGURE 5 the four motor drive has been illustrated, it will be apparent that a two motor system may be employed, in which event the circuit arrangements and the valve 65 may be simplified. Further, by employing these same principles, but in a more complex circuit arrangement, a third speed range may be attained by placing all four of the motors 11 and 12 in a common series.

It will be understood that variations and modifications may be effected without departing from the spirit and scope of the novel concepts of this invention.

I claim as my invention:

1. In a hydraulic system having a four-wheel vehicle drive in which each wheel has a separate drive motor which is liable to speed variations due to conditions encountered during operation of the respective associated wheel, and a hydraulic circuit normally motivating all of the motors at an equal operating speed in spite of any such conditions and including a power source and a pump, the improvement comprising:

a single automatically pressure response flow splitter valve through which all hydraulic pressure fluid passes to actuate all four motors in one direction and operative normally to distribute the hydraulic pressure fluid by equal volume to the motors by respective pairs;

and respective automatically responsive individual flow splitter valves which receive the hydraullic pressure fluid for each pair of motors from said single valve;

said individual valves operating to adjust the driving torque in their respective associated pair of motors when either of the motors of the pair encounters an abnormal condition tending either to increase or decrease its driving torque, and said single valve being automatically responsive to pressure abnormalities referenced thereto by operation of either of said individual valves to effect appropriate adjustment of hydraulic pressure fluid volume to the other of said individual valves;

whereby substantially uniform driving torque is maintained constantly in all of said motors and thereby substantially uniform force of traction in all of the wheels.

2. A hydraulic system according to claim 1, said single valve and each of said individual valves being a separate valve with separate hydraulic connections from each pair of motors to its individual valve, and with hydraulic connections from each of the individual valves to said single valve.

3. A hydraulic system according to claim 1, said single valve and said individual valves comprising respective valve plungers disposed concentrically in a common bore in a housing, said single valve comprising a dumbbell plunger, a single hydraulic pressure passage communicating between the dumbbell portions of said single valve, respective passages extending from between said dumbbell portions to the respective opposite ends of said individual valves, respective passages from said housing from each opposite end of each of the individual valves for connection with the respective motors of the pairs of motors controlled by the individual valves, and springs normally maintaining said single and individual valves in a normal relation one to the other and to said passages, one end of each of said individual valves confronting the respective adjacent end of said single valve and the single valve being thereby directly referenced to pressure differentials encountered by the respective confronting ends of the individual valves.

4. A hydraulic system according to claim 1, said hydraulic circuit comprising two substantially equal parts, one for driving said motors in one direction and the other for driving the motors in the opposite direction, and each of the circuit parts having a single automatic pressure responsive flow splitter valve and a pair of individual valves as set forth, means for selectively directing pump pressure into either of said circuit parts, and each of said circuit parts having check valve controlled passages bypassing the respective valves in that circuit part to return hydraulic fluid from the motors to the pump when the other of said circuit portions receives the hydraulic fluid under pressure from the pump.

5. In a hydraulic system for driving a plurality of members such as vehicle wheels in either of opposite directions, including a separate motor for each member liable to speed variations due to conditions encountered during operation of the respective member, and a hydraulic circuit connecting said motors in series for nominally motivating the motors at an equal operating speed in either of said opposite directions in the absence of any of said conditions, the improvement comprising:

a control valve structure in said circuit operative to effect compensation for said conditions when they occur during operation of the members whereby to maintain all of the motors operating at substantially equal speed in either of said opposite directions;

said control valve structure comprising a pressure sensitive valve including a plunger valve member having one end surface referenced directly to the pressure between the motors;

said valve plunger having a reduced diameter extension extending from its opposite end and providing a pressure receiving surface on said valve plunger at juncture of the reduced diameter portion and a larger diameter portion having said one end surface, and providing another pressure receiving surface on the free end of the reduced diameter portion;

each of said pressure receiving surfaces being about one-half the area of said one end surface;

said circuit including a connection with said reduced diameter portion end pressure receiving surface to direct hydraulic pressure theretoward when the motors are driven in one direction;

a port normally closed by said reduced diameter portion during equal operating speed of said motors in said one direction and opened by shifting of said plunger responsive to a demand referenced to said one end surface to supply hydraulic pressure fluid through said port between the motors;

a connection between said circuit and said pressure receiving surface at juncture of the reduced diameter portion with the larger diameter portion to deliver hydraulic pressure fluid thereto when the motors are driven in the opposite direction; and a port normally closed by said larger diameter valve portion when the motors are operating at an equal speed but opened when the plunger is shifted in response to a speed variation in the motors to deliver hydraulic pressure fluid between the motors to effect substantial equilization in operating speed of the motors.

6. In a system according to claim 5, comprising control means for operating said motors in parallel in said circuit, and means selectively operative to connect the motors in parallel relationship wherein said control means are operative to operate the motors in parallel and alternatively operative to connect the motors in series wherein said control valve structure is operative.

7. In a hydraulic system according to claim 5, means in said circuit for operating the motors in parallel, and control means operative to effect three optional running relationships in the circuit with respect to said motors comprising a first option connecting the motors to run in parallel for low speed, high torque operation, a second option in which the motors are connected to run in a plurality of parallel series for high speed operation, and a third option in which said motors are run in series relationship and said valve structure is operative to effect compensation for the conditions which may tend to cause unequal operating speed in the motors.

8. In a hydraulic system having a four-wheel vehicle drive in which each wheel has a separate drive motor which is liable to speed variations due to conditions encountered during operation of the respective associated wheel, and a hydraulic circuit normally motivating all of the motors at an equal operating speed in spite of any such conditions and including a power source and a pump, the improvement comprising:

means for operating the motors in parallel, including:

a single automatically pressure responsive flow splitter valve through which all hydraulic pressure fluid passes to actuate all four motors in one direction and operative normally to distribute the hydraulic pressure fluid by equal volume to the motors by respective pairs;

and respective automatically responsive individual flow splitter valves which receive the hydraulic pressure fluid for each pair of motors from said single valve;

said individual valves operating to adjust said driving torque in their respective associated pair of motors when either of the motors of the pair encounters an abnormal condition tending either to increase or decrease its driving torque, and said single valve being automatically responsive to pressure abnormalities referenced thereto by operation of either of said individual valves to effect appropriate adjustment of hydraulic pressure fluid volume to the other of said individual valves;

means for operating the motors in series, including:

a control valve structure in said circuit operative to effect compensation for said conditions when they occur during operation of the member whereby to maintain all of the motors operating at substantially equal speed in either of said opposite directions;

said control valve structure comprising a pressure sensitive valve including a plunger valve member having one end surface referenced directly to the pressure between the motors;

said valve plunger having a reduced diameter extension extending from its opposite end and providing a pressure receiving surface on said valve plunger at juncture of the reduced diameter portion and a larger diameter portion having said one end surface, and providing another pressure receiving surface on the free end of the reduced diameter portion;

each of said pressure receiving surfaces being about one-half the area of said one end surface;

said circuit including a connection with said reduced diameter portion end pressure receiving surface to direct hydraulic pressure theretoward when the motors are driven in one direction;

a port normally closed by said reduced diameter portion during equal operating speed of said motors in said one direction and opened by shifting of said plunger responsive to a demand referenced to said one end surface to supply hydraulic pressure fluid through said port between the motors;

a connection between said circuit and said pressure receiving surface at juncture of the reduced diameter portion with the larger diameter portion to deliver hydraulic pressure fluid thereto when the motors are driven in the opposite direction; and a port normally closed by said larger diameter valve portion when the motors are operating at an equal speed but opened when the plunger is shifted in response to a speed variation in the motors to deliver hydraulic pressure fluid between the motors to effect substantial equalization in operating speed of the motors:

and control means selectively operative to activate either of said means for operating the motors;

whereby substantially uniform driving torque is maintained constantly in all of said motors in both the parallel and series operation of the motors to thereby attain substantially uniform force of traction in all of the wheels.

References Cited

UNITED STATES PATENTS

| | | | |
|---|---|---|---|
| 1,999,834 | 4/1935 | Ernst | 91—412 XR |
| 2,365,095 | 12/1944 | Miller et al. | 137—101 |
| 2,460,774 | 2/1949 | Trautman | 91—412 XR |
| 2,643,664 | 6/1953 | Willett | 91—412 XR |
| 3,195,669 | 7/1965 | Court | 60—53 XR |
| 3,355,886 | 12/1967 | Weisenbach | 60—53 XR |
| 3,435,616 | 4/1969 | Waldorff | 60—53 |

FOREIGN PATENTS 111,109    7/1944    Sweden.

EDGAR W. GEOGHEGAN, Primary Examiner

U.S. Cl. X.R.

60—53, 97; 91—412; 137—101; 180—66

UNITED STATES PATENT OFFICE
CERTIFICATE OF CORRECTION

Patent No. 3,506,081         Dated   April 14, 1970

Inventor(s) Rollin Douglas Rumsey

It is certified that error appears in the above-identified patent and that said Letters Patent are hereby corrected as shown below:

Column 2, line 5, after "speeds" insert --and equal--, line 24, for "arrangemnt" read --arrangement--. Column 4, line 67, for "serve" read --serves--. Column 6, line 24, for "response" read --responsive--, line 31, for "hydraullic" read --hydraulic--. Column 7, lines 14 and 15, for "nominally" read --normally--. Column 8, line 22, for "said" (second occurrence) read --the--, line 36, for "member" read --members--.

SIGNED AND SEALED
DEC 22 1970

(SEAL)
Attest:

Edward M. Fletcher, Jr.
Attesting Officer

WILLIAM E. SCHUYLER, JR.
Commissioner of Patents

FORM PO-1050 (10-69)